United States Patent [19]
Tillman

[11] 3,848,839
[45] Nov. 19, 1974

[54] CONDUIT SUPPORT CLAMP

[76] Inventor: Gary P. Tillman, 1704 Dudley St., Erie, Pa.

[22] Filed: Jan. 10, 1974

[21] Appl. No.: 432,280

Related U.S. Application Data

[63] Continuation-in-part of Ser. No. 220,624, Jan. 25, 1972, abandoned.

[52] U.S. Cl. .............. 248/54 R, 248/62, 248/74 A, 308/26
[51] Int. Cl. ............................................... F16l 3/04
[58] Field of Search....... 24/73 R, 73 B, 81 B, 81 R; 248/74 R, 74 B, 54 R, 15, 10, 56, 62, 74 A; 308/26

[56] References Cited
UNITED STATES PATENTS

| | | | |
|---|---|---|---|
| 1,761,533 | 6/1930 | Patch | 308/26 |
| 2,018,860 | 10/1935 | Lord | 248/10 |
| 2,110,701 | 3/1938 | Farmer | 248/10 |
| 2,404,473 | 7/1946 | Chunn | 248/74 B |
| 2,466,912 | 4/1949 | Rice | 248/74 B |
| 2,580,119 | 12/1951 | Meyers | 308/26 |
| 3,243,151 | 3/1966 | Varney et al. | 248/74 R |
| 3,266,761 | 8/1966 | Walton et al. | 248/54 R |
| 3,332,650 | 7/1967 | Judge | 248/74 R |
| 3,576,304 | 4/1971 | Gillemot et al. | 248/74 A |

FOREIGN PATENTS OR APPLICATIONS

| | | | |
|---|---|---|---|
| 762,539 | 11/1956 | Great Britain | 248/10 |
| 593,178 | 2/1960 | Canada | 308/26 |

*Primary Examiner*—H. Hampton Hunter
*Attorney, Agent, or Firm*—James W. Wright

[57] ABSTRACT

An elastomeric conduit clamp for supporting an elongate conduit relative to a structure is provided. The clamp includes an elastomeric body having a bore extending axially therethrough for receiving the member. The body is divided into first and second axially spaced portions. The bore in the first portion is such as to allow it to be disposed in circumferentially spaced relation to the conduit while the bore in the second portion is such as to allow it to circumferentially engage the conduit. Attaching means is carried by the first portion for fixedly securing it, preferably circumferentially, to the structure whereby relative motion normal to the conduit results in predominately shear of the elastomer body between the first and second portions. The clamp is also designed to facilitate easy installation.

14 Claims, 6 Drawing Figures

PATENTED NOV 19 1974 3,848,839

3,848,839

CONDUIT SUPPORT CLAMP

This is a continuation in part of application Ser No. 220,624, filed Jan. 25, 1972 and now abandoned.

BACKGROUND

In the supporting of conduits for the transmittal of various media such as air, water, steam, hydraulic fluid, fuel, and the like, there are several aspects to be considered including vibration and other types of relative motion between the conduit and support, radial and axial thermal expansion, force levels during relative motion, misalignment, available space, ease of installation, galvanic corrosion, and economics.

Vibration of the conduit is usually a result of non-steady state passage of a media under pressure through the conduit, vibration of the supporting structure, and vibration induced by other mechanisms such as pumps, engines, and the like. Uncontrolled vibration results in deflection of the conduit which can lead to early fatigue failure of the conduit, supporting structure, means connecting the conduit to the supporting structure, breakage of seals and joints and interference with other associated mechanisms, especially where the conduit or parts thereof vibrate at or near resonance. In addition, extreme vibration usually is associated with an undesirable noise level.

It is conventional practice to suspend or support the conduit at spaced intervals along the conduit relative to a support structure not only to support the conduit but to minimize, if not alleviate, vibrational problems. The most common practice is to rigidly mount the conduit at frequent intervals to a relatively large mass support structure. However, this does not prevent vibration and deflection of the conduit between and at support points and oftentimes presents other problems such as clamp failure, wear, galvanic corrosion and inability to accommodate thermal expansion of the conduit.

To alleviate many of these problems, more sophisticated support clamps have been proposed wherein some lining material such as elastomer, wire mesh, felt, and the like, have been interposed between an encircling or captive rigid strap and the conduit in compression. Such lining serves to cushion to some extent vibrations experienced by the conduit while accommodating some thermal expansion of the conduit and in some instances electrically insulating the strap from the conduit to prevent galvanic corrosion. However, it has been found that clamps of this type are not suitable where a low vibrational frequency is to be isolated. Since the lining material is normally loaded in compression, a very large thickness of lining material is necessary to provide effective isolation and have adequate fatigue life. Such devices consume a relatively large amount of space, particularly normal to the conduit, which devices cannot be accommodated in many applications.

SUMMARY

With the above in mind, it is an object of the present invention to provide a resilient conduit support clamp for vibrationally isolating the conduit.

Another object of the present invention is to provide a captive elastomeric conduit support clamp for vibrationally isolating a conduit by shearing deformation of the elastomer in the clamp.

A further object of the present invention is to provide such a captive elastomeric conduit support clamp which is easy to install, economical to manufacture and can be made relatively small comparable to similarly effective prior art conduit support clamps.

A still further object of the present invention is to provide a captive elastomeric conduit support clamp the radial stiffness of which can be readily controlled.

And still another object of the present invention is to provide such a captive elastomeric conduit support clamp which accommodates relative motions other than vibrations, minimizes force levels during relative motions, accommodates misalignment and electrically insulates the conduit from the support structure to prevent galvanic corrosion.

Briefly, the objects of the present invention are accomplished by providing an elongate elastomeric body having a bore extending axially therethrough for receiving therein a conduit to be supported. The elastomer body is divided into first and second axially spaced portions. The portion of the bore through the first portion is such that the first portion receives the conduit in circumferentially spaced relation thereto while the bore in the second portion is such that the second portion conforms to and frictionally engages the conduit circumferentially thereof. to facilitate installation of the elastomer body in encircling relation to the conduit, a slit may be formed from the bore to the exterior of the body the length thereof to allow resilient spreading of the body and positioning over the conduit.

Means in the form of a rigid strap is carried by the first portion for fixedly attaching the first portion to a support structure, preferably with the slit facing the structure. The strap is, preferably, generally U-shaped and embedded in and bonded to the first portion with the slit positioned in the space between the strap legs. Apertured end extensions may be formed integrally with the U-shaped strap which project laterally outward therefrom for attaching to the support structure. To insure maintenance of the second portion in engaging relation with the conduit, reinforcing means may be provided which either form an integral part of the clamp or are added after installation.

BRIEF DESCRIPTION OF DRAWINGS

Some of the objects of the invention have been stated, other objects will appear as the description proceeds, when taken in connection with the accompanying drawings, in which.

DETAILED DESCRIPTION OF PREFERRED EMBODIMENTS

Figure 1:
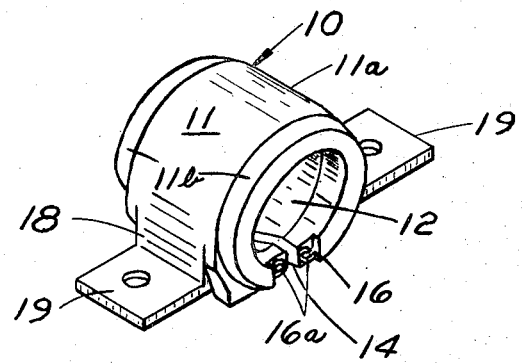
FIG. 1 is a perspective view of a captive resilient conduit support clamp of the present invention.
Figure 2:
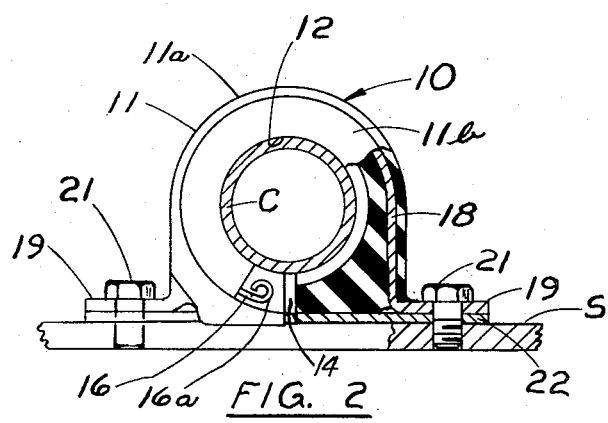
FIG. 2 is an enlarged front plan view with parts in section showing the application of a resilient conduit support clamp of FIG. 1 for supporting a conduit relative to a support structure.
Figure 3:
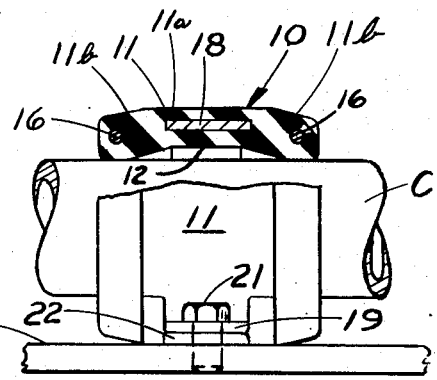
FIG. 3 is a side plan view with parts in section of the assembly of FIG. 2.

With reference now to the various figures wherein like reference characters are employed to indicate like parts, there is shown in FIGS. 1-3 a captive resilient conduit support clamp, generally indicated at 10, of the present invention which may be used to mount a conduit C or the like member relative to a support structure S.

The resilient conduit support clamp 10 comprises an elongate generally cylindrical body 11 of elastomer such as natural or synthetic rubber, the choice of which will depend largely on the environmental conditions in which the clamp is to be used. The body 11 has a generally cylindrical shaped bore 12 extending axially therethrough for receiving the conduit to be supported. The elastomer body 11 is axially divided into a first or central portion 11a and second or opposite end portions 11b. While only one second portion 11b is required, two such portions are preferred on opposite sides of the first portion 11a to provide symmetry. The bore 12 is of different diameter in the central portion 11a than in the end portions 11b. The portion of the bore 12 in the central portion 11a is larger in diameter than the conduit to be received therein such that with the conduit received therein, the central portion 11a will be in circumferentially spaced relation thereto. The portion of the bore 12 in the opposite end portions 11b is substantially the same diameter, if not less than, the diameter of the conduit such that with the conduit received in the bore 12, the opposite end portions 11b will conform to and frictionally engage the conduit circumferentially thereof at axially spaced locations along the conduit. Reference is made to FIG. 3 wherein a cylindrical conduit C is shown received in the elastomer body 11 with the central portion 11a in circumferentially spaced relation to the conduit C and the opposite end portions 11b frictionally engaging the conduit C circumferentially thereof at axially spaced locations.

To facilitate easy and economic installation of the elastomeric body 11 to the conduit C, a slit 14 is formed in the body 11 from the bore 12 to the exterior thereof throughout its axial length. The slit 14 allows resilient spreading of the body 11 for positioning in encircling or captive relation to the conduit C.

Reinforcing means, preferably resilient, may be provided which cooperate with each of the opposite end portions 11b for insuring maintenance of the end portions 11b in engaging relation with the conduit C. However, where such reinforcing means are employed it is preferred that these means not interfere with the easy installation feature discussed above. In support clamp 10 of FIGS. 1-3, reinforcing means in the form of resilient retaining rings or bands 16 are embedded in and bonded to the opposite end portions 11b. Retaining rings 16 are of conventional design and are disposed such that the ends thereof terminate adjacent the slit 14 in the elastomeric body 11 with the eyelet portions 16a exposed for access externally with conventional retaining ring pliers for resilient spreading thereof. It will be apparent that resilient spreading of the retaining rings 16 will also result in resilient spreading of the elastomer body 11. Thus, the clamp 10 remains easy and economical to install.

The central portion 11a of the elastomeric body 11 is fixedly attachable to the structure S, preferably circumferentially thereof for reasons that will hereinafter be apparent. For this purpose, a rigid generally U-shaped strap 18 having a part in the shape of a semicircle and a depth of substantially the diameter of the semicircle is disposed about and, preferably, embedded in and bonded to the central portion 11a and oriented with the slit 14 positioned in the space between the legs of the strap 18. By this orientation, the strap 18 does not interfere with resilient spreading of the elastomeric body 11 for installation. The strap 18, preferably, has opposed apertured end extensions 19 formed integrally therewith and projecting laterally outward from the ends of the legs of the strap 18. These extensions facilitate fixedly attachment of the body 11 to a support structure S as shown in FIGS. 2 and 3 by conventional screws 21 threadably received in the support structure S. Through this method of attachment, the slit 14 faces the support structure S and removal of the conduit C from the clamp 10 is prevented.

As best illustrated in FIGS. 2 and 3, the central portion 11a of the elastomeric body 11 is substantially flush with the strap extensions 19 so that upon installation the segment of the central portion 11 between the ends of the legs of the strap 18 abut the support structure S. It will also be noted that the external diameter of the opposite end portions 11b is reduced relative to the central portion 11a, FIG. 3, whereby the opposite end portions 11b are spaced from the support structure S. A further part of the attaching means may include a support plate 22 having spaced apertures therein to coincide with the desired spacing of the apertures in the extensions 19 of strap 18. The support plate 22 bridges the space between the legs of the strap 18. While this plate 22 is not essential, it insures that the clamp 10 is installed with the size of the bore 12 not enlarged or reduced by mounting the screws 21 at improperly spaced distances which could result in deformation of the clamp 10 that could render it less effective than otherwise. In addition, it enhances the stability of the central portion 11a between the terminal ends of the strap legs.

Operationally the clamp 10 is installed by resiliently spreading the central portion 11a of the body 11 adjacent the slit 14 and placing it over the conduit C. Upon releasing the clamp 10, the conduit will be received in the bore 12. Also, the clamp 10 may be mounted over the end of the conduit C and slipped the length of the conduit C to the desired location. As shown in FIG. 3, the central portion 11a will encircle the conduit C in circumferentially spaced relation thereto while opposite end portions 11b will encircle and frictionally engage the condut C circumferentially at axially spaced locations. The support plate 22, if employed, is inserted with the apertures in the strap extensions 19 aligned with the apertures therein. Screws 21 are inserted through the aligned apertures and threadably received in the support structure S. It will be apparent from the foregoing description that the central portion 11a, due to rigid strap 18, is stable relative to the support structure S whereas the opposite end portions 11b are stable relative to the conduit C. Any forces tending to cause relative motion between the conduit C and support structure S will result in deformation of the elastomeric body 11. Relative motion normal to the conduit C will result in predominately shear between the central portion 11a and opposite end portions 11b. By acting in shear, a relatively soft resilient support clamp 10 is provided in this mode, the primary vibration mode. It will also be apparent that the softness of the clamp 10 normal to conduit C can be readily controlled by techniques within the knowledge of those reasonably skilled in vibration control. Should the magnitude of movement of the conduit C relative to the support structure S exceed that allowable by the space between the conduit C and the central portion 11a, such movement will be cushioned by the central portion 11a. However, to insure effective isolation during normally encountered vibration conditions, the clamp 10 should be designed to accommodate those motions without being snubbed or cushioned by the central portion 11a.

Any thermal expansion or relative motions between the conduit C and support structure S will initially be accommodated by flexure of the opposite end portions 11b. However, relatively large axial thermal expansions or motions of the conduit C will result in slippage between the conduit C and opposite end portions 11b at a low force level. Also the conduit C is not placed in electrical communication with any dissimilar metal and, thus, no problems of galvanic corrosion are presented. To prevent any galvanic corrosion between support structure S, strap 18 and support plate 22, they should be formed of the same material, if metal. Also, with the captive nature of the clamp 10, there is no danger in the conduit C becoming detached from the support structure S.

Figure 4:
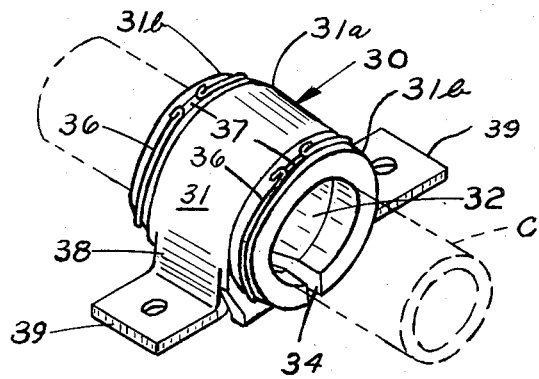
FIGS. 4–6 are perspective views of modified resilient conduit support clamps of the present invention.

With reference to FIG. 4, there is shown a modified resilient conduit support clamp 30, the reference characters for which have been increased by 20 over that of clamp 10, employing other type reinforcing means that may be provided for the opposite end portions 31b. In this embodiment grooves 37 are circumferentially disposed in the exterior of the opposite end portions 31b with resilient retaining rings 36 disposed in the grooves 37 to insure maintenance of the end portions 31b in engagement with the conduit C. In this instance, the retaining rings 36 will not be installed until after the remaining portions of the clamp 30 are in position.

Figure 5:
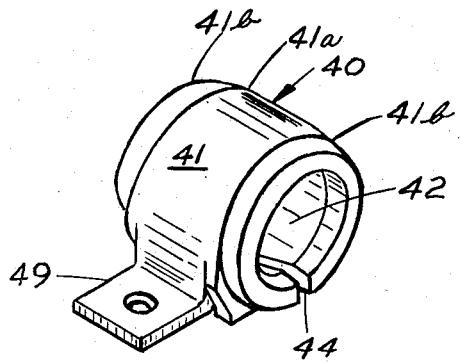
Figure 6:
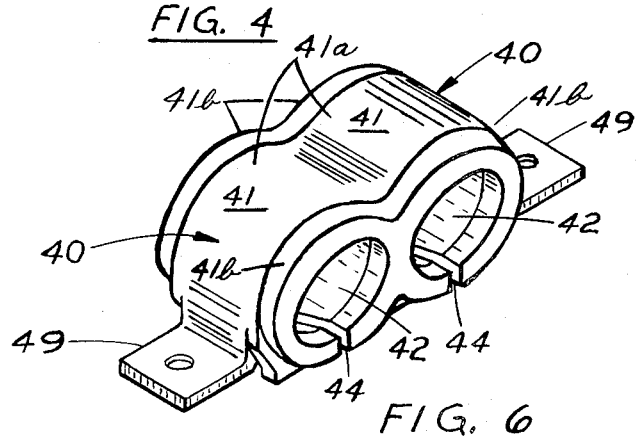

In FIG. 5 there is shown a simplified version of a conduit support clamp, generally indicated at 40, of the present invention, the reference characters for which have been increased by 30 over that of clamp 10. In this embodiment, no end portions reinforcing means are employed and only one strap extension 49 has been provided for attachment to a support structure. In FIG. 6, a pair of resilient support clamps similar to that of FIG. 5, same reference characters employed, have been formed integrally for supporting closely adjacent conduits.

In the drawings and specifications, there has been set forth several preferred embodiments of the invention and, although specific terms are employed, they are used in a generic and descriptive sense only and not for purposes of limitation.

What is claimed is:

1. A conduit support clamp for supporting an elongate conduit relative to a structure comprising
   an elongate elastomeric body having a bore extending axially therethrough for receiving the conduit therein, said elastomeric body having a central portion for receiving the conduit in circumferentially spaced relation thereto and opposite end portions axially spaced from said central portion for receiving the conduit in frictionally engaging relation circumferentially thereof at axially spaced locations and forming the only interconnection of said elastomeric body with said conduit, and
   rigid means carried by said central portion in spaced relation from said opposite end portions for substantially encircling the conduit and fixedly attaching said central portion in circumferentially spaced relation of the conduit to the structure for movement of said central portion with the structure relative to said opposite end portions in response to relative motion between the conduit and structure normal to the conduit, said relative motion being accommodated predominantly by shear in said elastomeric body between said central and opposite end portions.

2. The clamp, according to claim 1, wherein said central portion attaching means comprises a rigid strap secured circumferentially of and to said central portion.

3. The clamp, according to claim 1, wherein said central portion attaching means comprises a rigid U-shaped strap disposed about and secured to said central portion, said strap having at least one apertured end extension formed integrally therewith and projecting laterally therefrom for attachment to the structure.

4. The clamp, according to claim 1, wherein said elongate elastomeric body is generally cylindrical and wherein said central portion attaching means comprises a rigid U-shaped strap having a part in the shape of a semicircle and a depth of substantially the diameter of the semicircle, said strap being embedded in and bonded to said central portion and having at least one apertured end extension formed integrally therewith and projecting laterally therefrom for attachment to the structure.

5. The clamp, according to claim 4, wherein the exterior diameter of said opposite end portions is reduced relative to the exterior diameter of said central portion.

6. The clamp, according to claim 1, including means cooperating with each of said opposite end portions of said elastomeric body for reinforcing and maintaining said end portions in frictional engagement with the conduit.

7. A conduit support clamp for supporting an elongate conduit relative to a structure comprising
   an elongate elastomeric body having a bore extending axially therethrough for receiving the conduit therein, said elastomeric body having a central portion for receiving the conduit in circumferentially spaced relation thereto and opposite end portions spaced axially from said central portion for receiving the conduit in frictionally engaging relation circumferentially thereof at axially spaced locations and forming the only interconnection of said elastomeric body with said conduit, said body also having a slit extending from the bore to the exterior of the body throughout the axial length thereof to allow resilient spreading of the body for easy installation on the conduit, and
   rigid means spaced from said slit and carried by said central portion in spaced relation from said opposite end portions for substantially encircling the conduit and fixedly attaching said central portion in circumferentially spaced relation of the conduit to the structure for movement of said central portion with the structure relative to said opposite end portions in response to relative motion between the conduit and structure normal to the conduit with said slit facing the structure to prevent removal of the conduit, said relative motion being accommodated predominantly by shear in said body between said central and opposite end portions.

8. The clamp, according to claim 7, including split resilient retaining ring means cooperating with said elastomer body end portions for reinforcing and maintaining said end portions in frictional engagement with the conduit.

9. The clamp, according to claim 8, wherein said ring means are embedded in and bonded to said elastomer body end portions.

10. The clamp, according to claim 7, including a groove circumferentially disposed in the exterior of each of said elastomer body end portions, and resilient retaining ring means disposed in said grooves for reinforcing and maintaining said end portions in frictional engagement with the conduit.

11. A conduit support clamp for supporting an elongate conduit relative to a structure comprising an elastomeric body having a bore extending axially therethrough for receiving the conduit therein, said elastomeric body having a central portion for receiving the conduit in circumferentially spaced relation thereto and opposite end portion spaced axially from said center portion for receiving the conduit in frictionally engaging relation circumferentially thereof at axially spaced locations and forming the only interconnection of said elastomeric body with said conduit, said body also having a slit extending from the bore to the exterior of the body throughout the axial length thereof to allow resilient spreading of the body for easy installation of said body on the conduit, and a rigid generally U-shaped strap embedded in and bonded to said central portion in spaced relation from said opposite end portions for substantially encircling the conduit with said slit positioned in the space between the legs of said strap whereby said strap does not prevent resilient spreading of said elastomeric body, said strap having opposed apertured end extensions formed integrally therewith and projecting laterally therefrom for fixedly attaching said central portion in circumferentially spaced relation of the conduit to the structure for movement of said central portion with the structure relative to said opposite end portions in response to relative motion between the conduit and structure normal to the conduit with said slit facing the structure to prevent removal of the conduit, said relative motion being accommodated predominantly by shear in said body between said central and opposite end portions.

12. A conduit support clamp for supporting an elongate conduit relative to a structure comprising an elongate generally cylindrical elastomeric body having a cylindrical bore extending axially therethrough for receiving the conduit therein, said elastomeric body having a central portion and opposite end portions axially spaced from said central portion, the diameter of said bore through said opposite end portions substantially conforming to the diameter of the conduit to be supported and the diameter of said bore through said central portion being greater than the diameter of the conduit whereby said opposite end portions will receive the conduit in circumferentially engaging relation thereto and said central portion will receive the conduit in frictionally engaging relation circumferentially thereof at axially spaced locations, said engaging relation of said opposite end portions with said conduit forming the only interconnection of said elastomeric body with said conduit, said body also having a slit extending from the bore to the exterior of the body through the axial length thereof to allow resilient spreading of the body for easy installation to the conduit, and a rigid generally U-shaped strap having a part in the shape of a semicircle and a depth of substantially the diameter of the semicircle bonded to said central portion in spaced relation from said opposite end portions for substantially encircling the conduit with said slit positioned in the space between the legs of said strap whereby said strap does not prevent resilient spreading of said elastomeric body, said strap having opposed apertured and extensions formed integrally with the ends of the legs of said strap and projecting laterally outward therefrom for fixedly attaching said central portion in circumferentially spaced relation of the conduit to the structure for movement of said central portion with the structure relative to said opposite end portions in response to relative motion between the conduit and structure normal to the conduit with said slit facing the structure to prevent removal of the conduit, said relative motion being accommodated predominantly by shear in said body between said central and opposite end portions.

13. The clamp, according to claim 12, wherein the exterior diameter of said opposite end portions are reduced relative to the greater diameter of said semicircle and central portion.

14. A conduit support clamp for supporting an elongate conduit relative to a structure comprising an elongate elastomeric body having a bore extending axially therethrough for receiving the conduit therein, said elastomeric body having a first portion for receiving the conduit in circumferentially spaced relation thereto and a second portion axially spaced from said first portion for receiving the conduit in frictionally engaging relation circumferentially thereof and forming the only interconnection of said elastomeric body with said conduit, and rigid means carried by said first portion in spaced relation from said second portion for substantially encircling the conduit and fixedly attaching said first portion in circumferentially spaced relation of the conduit to the structure for movement of said first portion with the structure relative to said second portion in response to relative motion between the conduit and structure normal to the conduit, said relative motion being accommodated predominantly by shear in said elastomeric body between said first and second portions.

* * * * *